(12) United States Patent
Wössner

(10) Patent No.: US 12,364,178 B2
(45) Date of Patent: Jul. 22, 2025

(54) BOOM WORKING DEVICE AND METHOD FOR DETECTING LOADS ACTING ON THE BOOM

(71) Applicant: MULAG Fahrzeugwerk Heinz Wössner GmbH & Co. KG, Oppenau (DE)

(72) Inventor: Holger Wössner, Oberkirch (DE)

(73) Assignee: MULAG Fahrzeugwerk Heinz Wössner GmbH & Co. KG, Oppenau (DE)

(*) Notice: Subject to any disclaimer, the term of this patent is extended or adjusted under 35 U.S.C. 154(b) by 1207 days.

(21) Appl. No.: 17/112,968

(22) Filed: Dec. 4, 2020

(65) Prior Publication Data

US 2021/0204465 A1 Jul. 8, 2021

(30) Foreign Application Priority Data

Dec. 4, 2019 (DE) .......................... 102019133069.6

(51) Int. Cl.
| | |
|---|---|
| A01B 61/04 | (2006.01) |
| A01B 63/00 | (2006.01) |
| A01B 63/02 | (2006.01) |
| A01B 63/11 | (2006.01) |
| A01D 75/18 | (2006.01) |
| A01D 75/28 | (2006.01) |

(52) U.S. Cl.
CPC ............ *A01B 61/04* (2013.01); *A01B 63/004* (2013.01); *A01B 63/023* (2013.01); *A01B 63/11* (2013.01); *A01D 75/182* (2013.01); *A01D 75/287* (2013.01)

(58) Field of Classification Search
CPC ..... A01B 61/04; A01B 63/004; A01B 63/023; A01D 34/866; A01D 75/182; A01D 75/287
USPC ........................................ 172/776
See application file for complete search history.

(56) References Cited

U.S. PATENT DOCUMENTS

| | | | |
|---|---|---|---|
| 6,234,508 B1 | 5/2001 | Tuttle et al. | |
| 7,004,285 B2* | 2/2006 | Bailey | B66F 11/046 182/2.1 |
| 7,198,295 B2* | 4/2007 | Biziorek | A01D 34/863 172/6 |
| 7,364,044 B2* | 4/2008 | Hinata | B66C 23/905 280/765.1 |
| 8,973,342 B2* | 3/2015 | Ritter | A01D 41/141 460/6 |
| 9,144,199 B2* | 9/2015 | Ritter | A01D 41/14 |
| 10,676,328 B2* | 6/2020 | Benton | B66C 13/46 |
| 10,928,258 B2* | 2/2021 | Messenger | B66F 9/0655 |

FOREIGN PATENT DOCUMENTS

| | | | | |
|---|---|---|---|---|
| EP | 0682856 | | 11/1995 | |
| EP | 1776857 | | 4/2007 | |
| GB | 2495497 | | 4/2013 | |
| GB | 2495497 A | * | 4/2013 | ............ A01B 63/11 |
| JP | 2017072427 A | * | 4/2017 | |

* cited by examiner

*Primary Examiner* — Gary S Hartmann
(74) *Attorney, Agent, or Firm* — Head, Johnson, Kachigian & Wilkinson, PC

(57) ABSTRACT

In order to know the loads acting on the boom, the load measuring unit, in particular only one, is either on or in the boom, in particular fixed, or between the arm end of the boom and the head end of the working head facing it.

19 Claims, 10 Drawing Sheets

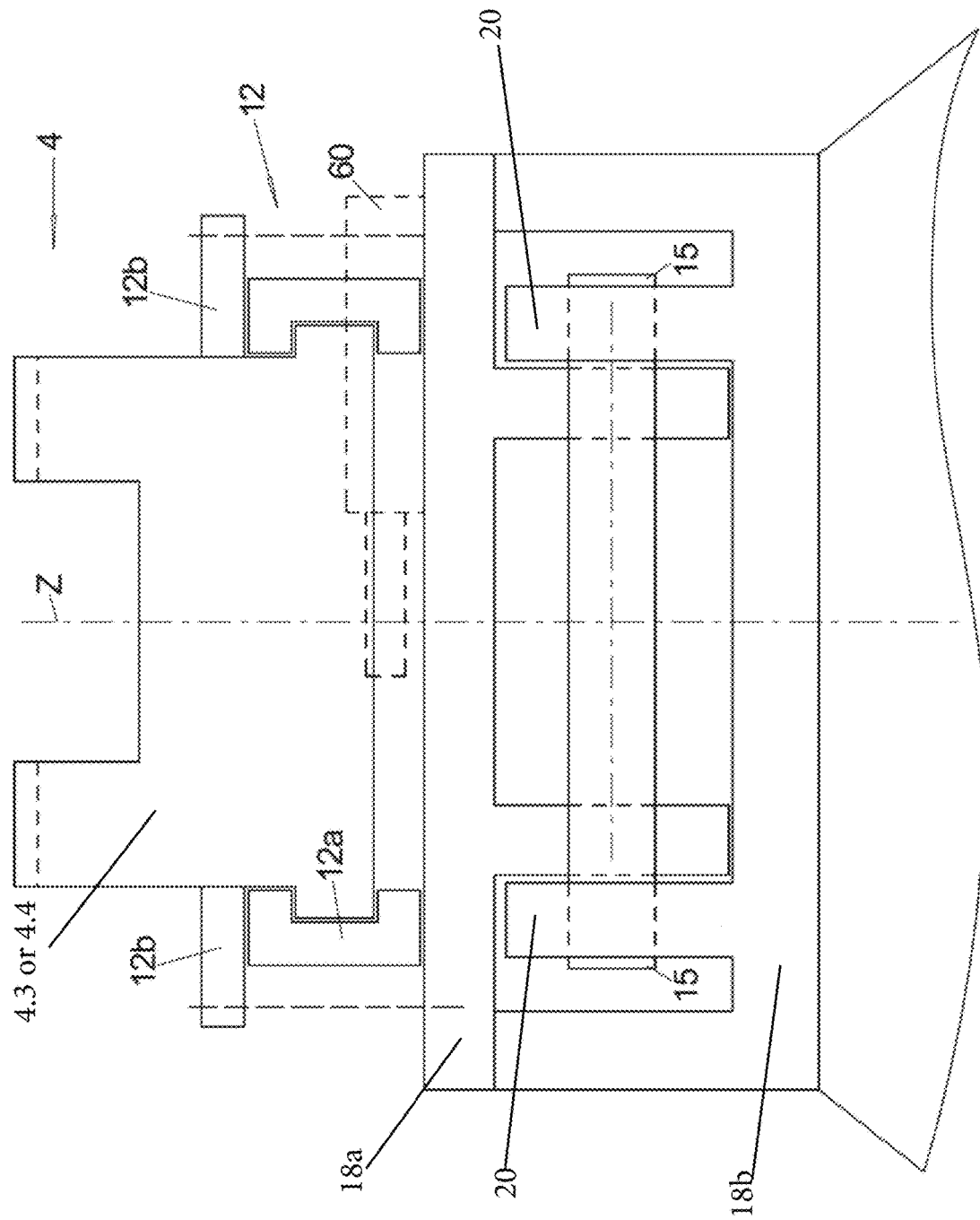

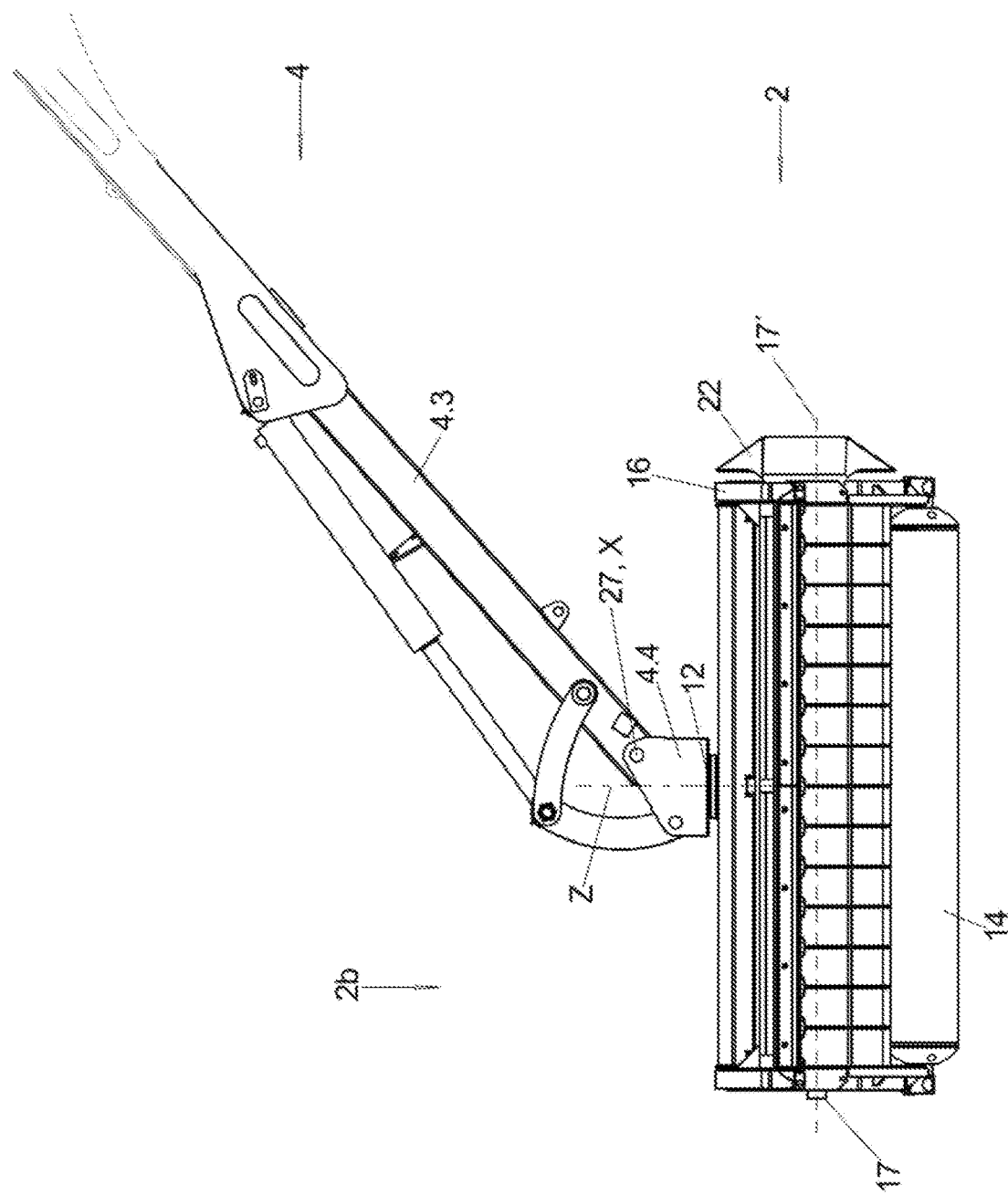

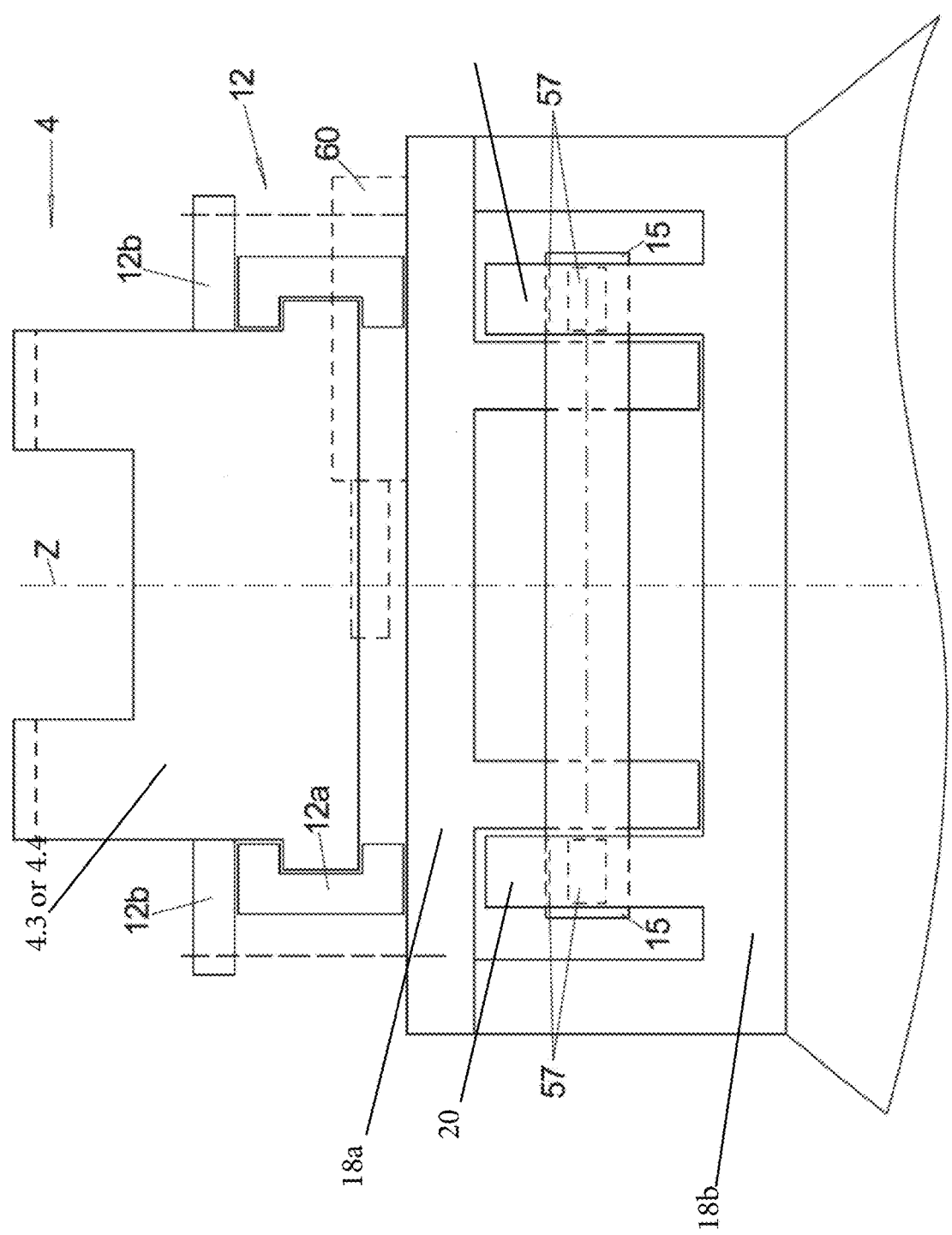

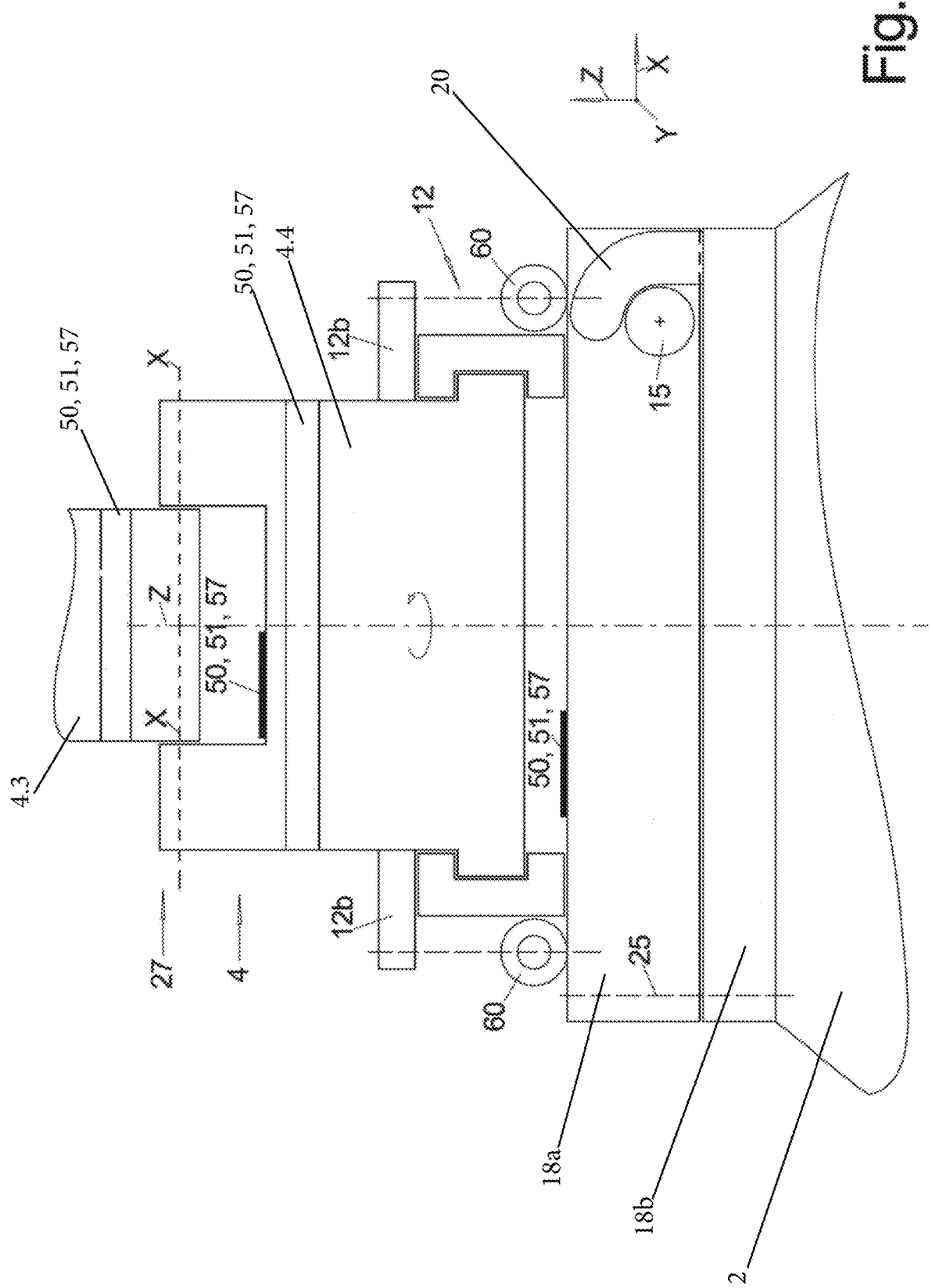

BOOM WORKING DEVICE AND METHOD FOR DETECTING LOADS ACTING ON THE BOOM

I. FIELD OF APPLICATION

Figure 1A:
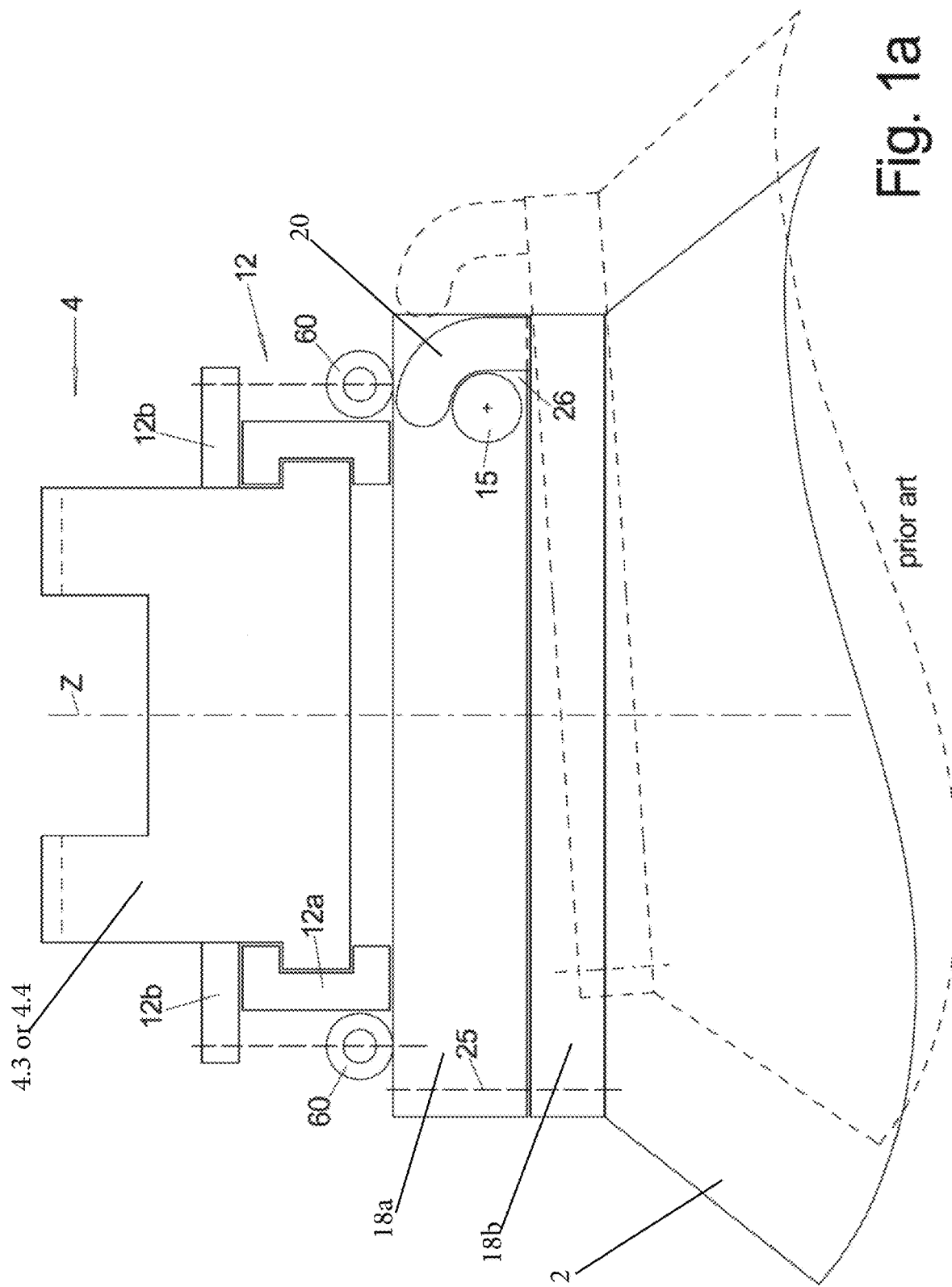

The invention refers to the detection of loads acting on the boom of a boom working device.

II. TECHNICAL BACKGROUND

With such a boom working device, loads are often transferred from the work head to the boom during work, not only by the weight of the work head, especially in dynamic operation, but often because the work head is in contact with the environment during work, and thus, for example, resistance forces are transferred from the environment to the work head and from there to the boom.

A typical example is a boom mower that is used to mow the vegetation on the verge next to a road. The working head is then a mowing head, and usually rests on the ground with one or more sensing rollers and is moved forward by the forward movement of the carrier vehicle.

Depending on the contact force on the ground, the contour of the ground in the direction of travel, the type and quantity of vegetation and other factors, this results in very different loads on the boom.

By knowing these loads, not only the position of the mowing head can be changed, e.g. with regard to the height or inclination of the mowing head in relation to the ground, and for this purpose the positioning elements, which set the relative position of the usually several arm parts of the boom to each other, can be adjusted, but also other parameters, such as the speed of the blade shaft of the mowing head.

Similar tasks also arise with other working devices such as a washing head with rotating brushes as a working head for cleaning the surfaces of sound insulation walls or tunnels.

Often a different working head is attached to the boom for different tasks.

It is well known that sensors for recording the load are placed directly on the working head.

The disadvantage is that a sensor equipment is required at each individual working head used and additionally a data connection from the working head to the boom, unless the data connection from the working head to the control of the boom working device is wireless, which in practice, however, is often failure-prone.

The advantage of this method is that the loads can be measured very close to the place where they occur, i.e. between the ground and the working head.

III. DESCRIPTION OF THE INVENTION a) Technical object

It is therefore the object according to the invention to create a boom working device which, despite a simple and only one-time construction of the sensor technology, reliably measures the loads at least on the boom, as well as a self-propelled working machine equipped in this sense with such a boom working device.

The object also consists of proposing a method for detecting the loads acting on the boom of a boom working device.

b) Solution of the object

With regard to the boom working device, this initially comprises the boom itself, which usually consists of several arm parts connected pivotable to each other and whose rear end is designed for attachment to a carrier vehicle.

In addition, at its front end the boom has an arm end which can be pivoted in relation to the rest of the boom by means of a Z-joint about an axis known as the Z-axis, and to which the working head can be attached by means of its head end facing the boom, by screwing or locking.

In addition, an X-joint can be provided in the front end area of the boom, by means of which two arm parts can be pivoted relative to each other about an X-axis running transversely, in particular perpendicularly, to the Z-axis. The X-joint can be arranged in front of or behind the Z-joint in the direction of the boom.

Such a boom working device has one, especially only one, load measuring unit with at least one load sensor to detect the loads acting on the boom.

According to invention this load measuring unit is arranged
- either on or in the boom (3, 4), especially stationary,
- or between head end of the working head and arm end of the boom.

This has the advantage that the required sensor equipment only has to be available once on the boom working device, especially on the boom, and thus away from the damage-intensive working head.

Although it can only be used to measure the loads acting on the boom, it can be used to draw meaningful conclusions as to how high the loads are that act on the working head from the environment.

Since the load is to be measured not only in one but more in different directions, the load measuring unit contains either several sensors, each measuring the load in only one direction, or at least one load sensor, which can measure the load in several directions, for example the X and Y direction perpendicular to the Z direction.

It is preferable to know all loads acting on the boom at its front end, and therefore the load measuring unit, especially the one or more load sensors, should measure both the forces in X, Y and Z directions and the torsional load, i.e. moments around these three spatial directions.

If the head end of the working head facing the boom is—as is usually the case—fixed to the arm end of the jib in a rotationally fixed manner, the measuring directions of the one or more load sensors always remain the same in their alignment to the working head, so that conclusions can also be drawn about the type and direction of the forces and loads acting on the working head.

Since different working heads can be attached to the boom, which behave quite differently with regard to the loads, it is important that the control unit controlling the boom working device also knows the relevant parameters of the working head, i.e. at least knows which type of working head is currently attached to the boom, in particular which specific working head is involved.

This is because even two mowing heads of the same type can introduce different loads into the boom due to different manufacturing tolerances or different wear conditions when mowing the same vegetation.

For this reason there is at least one detection sensor to detect the working head attached to the boom arm, again
- either at or in the boom, especially stationary,
- or between head end and arm end.

Preferably, there is then a detection sensor in the effective range of this detection sensor at the working head, especially at or in its head end, which the detection sensor can analyze and which contains the desired information regarding the attached working head.

Then, when attaching a working head, there is no longer any need to manually enter such working head-dependent parameters into the controller, which speeds up the work and avoids input errors.

Preferably one of the load sensors with such a detection sensor is functionally cleaned, which reduces the number of necessary sensors and thus the risk of damage.

If the load measuring unit is located on or in the boom, it is preferred
- either in or at the arm end of the boom, preferably swivelling around the Z-joint
- or at or in the rest of the boom, i.e. on the side of the Z-joint facing away from the working head, i.e. behind the Z-joint.

The former option has the advantage that the alignment of the load measuring unit relative to the working head always remains the same, independent of the pivot position of the Z-joint and thus of the front end of the boom, which greatly facilitates the evaluation and analysis of the measured loads with regard to their direction of action on the working head.

The second possibility, i.e. behind the Z-joint, comprises several possibilities if there is an additional X-joint in front:
- either between X-joint and Z-joint
- or behind both joints, no matter in which order they are present along the boom arm,
- or in the X-joint, e.g. at its or as its joint axis.

Individual load sensors or even entire load measuring units can also be present at different locations, especially at a distance along the boom arm, which then preferably measure forces or moments in different spatial directions.

The load measuring unit can also be located between the boom and the working head.

This can be useful if the working head is positively attached to the boom arm by means of a removable connecting element, e.g. a push-in connecting bolt, because then this removable connecting element can support the load measuring unit or be the load measuring unit itself.

The at least one load sensor of the load measuring unit can be a strain gauge or any other electrical sensor that changes its voltage or electrical resistance when loaded.

In order to protect such strain gauges well from damage, they can be arranged in recesses, especially in the front side of the arm end facing the working head or the rear side facing away from it, and in particular they can also be cast in them.

The strain gauges available with different orientations can be connected to each other via an electrical bridge circuit, which, if appropriately arranged, not only allows the loads to be determined linearly in the individual spatial directions, but also torsional loads, i.e. torques, around these three spatial directions can be determined.

Since both strain gauges and related external circuits, especially bridge circuits, are known and can be purchased at low cost, this results in a low-cost load measuring unit.

Instead of installing individual strain gauges, load measuring pins can also be used for the load measuring unit. These can also be purchased on the market and measure the force applied to the load measuring pin preferably in at least one of the transverse directions to the main direction of extension of the load measuring pin and, in particular, output it to the control. On or in such a loadcell, individual strain gauges can be installed as load sensors or other types of load sensors can be used.

Already one single load measuring pin can form such a load measuring unit.

This makes it easier and faster to set up the load measuring unit and of course to change it.

Often a locking pin is used to connect the working head and the boom. This pin is fixed to one of the two parts, usually the boom, and is inserted into a corresponding recess in the other part to couple the two parts, and in this position the two parts are locked together, for example by means of a movable locking element such as a swivel lever, which can preferably be operated from the boom.

This locking pin can then be designed directly as a load measuring pin, for example by mounting a purchased load measuring pin on the supporting components.

With this solution, the total number of existing components of the cantilever-type work unit is not increased by the load measuring unit, and the cantilever-arm-side connection from the load measuring pin to the control unit does not have to be modified when changing the work head.

Occasionally, a removable connecting element, such as a connecting bolt, which connects the two parts positively, is used to connect the working head and boom. This connecting element is inserted through aligned passage openings of bearing blocks, which are attached to the working head on the one hand and the boom on the other hand.

Then again a load measuring bolt can be used as such a connecting bolt without increasing the total number of components.

By arranging preferably several pairs of through-holes and load measuring pins inserted through them, the working head can be arranged in this way at the end of the arm so that it cannot rotate, and further mechanical fasteners can be dispensed with.

Since—especially the low-cost load pins only measure loads in one direction transverse to their longitudinal direction, at least two load pins and thus pairs of through holes will be arranged in two different transverse directions of the X-Y plane perpendicular to the Z-direction, preferably even two redundant load pins in each of these transverse directions.

Depending on the design, load measuring pins can also measure the tensile forces prevailing in their main direction of extension. For this purpose, the load measuring pin must of course be installed in such a way that it has corresponding stops at both ends in order to load it in the longitudinal direction, for example by designing the load measuring pin as a bolt with a nut to be screwed on.

Another possibility is to use a so-called ring force transducer for force measurement and/or torque measurement within the measuring device, which are available on the market.

This is a—usually cylindrical—component, to whose opposite end faces those components can be fastened, usually screwed, so that the ring force transducer measures those forces—in axial direction and/or at least one of the transverse directions to it—which prevail at this connection point between the two components to be connected with each other.

The two end faces of the ring force transducer are usually designed as rings or plates, which are connected to each other by webs or other connecting elements, on or in which the corresponding forces are measured, so that torques about at least one of the radial directions of the ring force transducer, if necessary instead or additionally also about the axial direction of the ring force transducer can be determined from them.

Such a ring force transducer is preferably bolted with its axial direction aligned with the longitudinal direction of the Z-joint between the arm end of the boom and the head end of the working head.

With regard to a self-propelled working machine equipped with a previously described boom working device and where the load measuring unit is arranged and/or designed as described above, the control can thus control the self-propelled working machine on the basis of the signals of the load measuring unit, in particular the load sensors and/or the at least one detection sensor, by controls the positioning elements for positioning the individual arm parts of the boom arm in relation to each other and to the carrier vehicle,
especially controls the swivel position of the arm end of the boom and/or controls the working head, for example with regard to the drive speed of the driven tools present there, such as a mower shaft, and/or controls the travel speed of the carrier vehicle.

This avoids a damage-endangered arrangement of sensors on the working head itself and it is not necessary to have a separate sensor equipment on each working head.

With regard to the method of detecting the loads acting on the jib arm of a jib working device, especially in the case of a jib working device according to one of the preceding claims, the load is measured
either at or in the boom
or between head end and arm end.
This also provides the above mentioned advantages.

c) Exemplary Embodiments

Figure 2A:
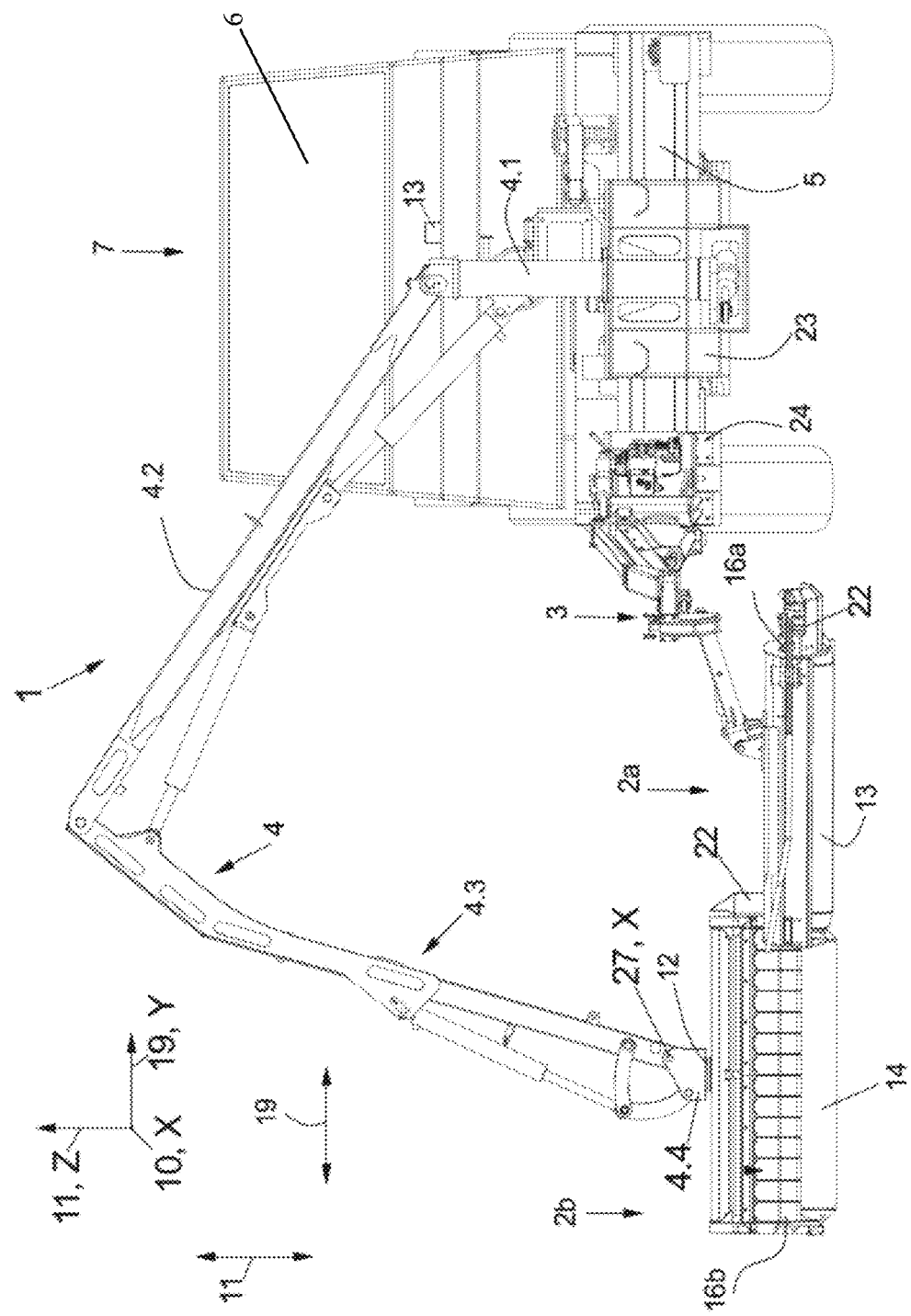
Figure 2B:
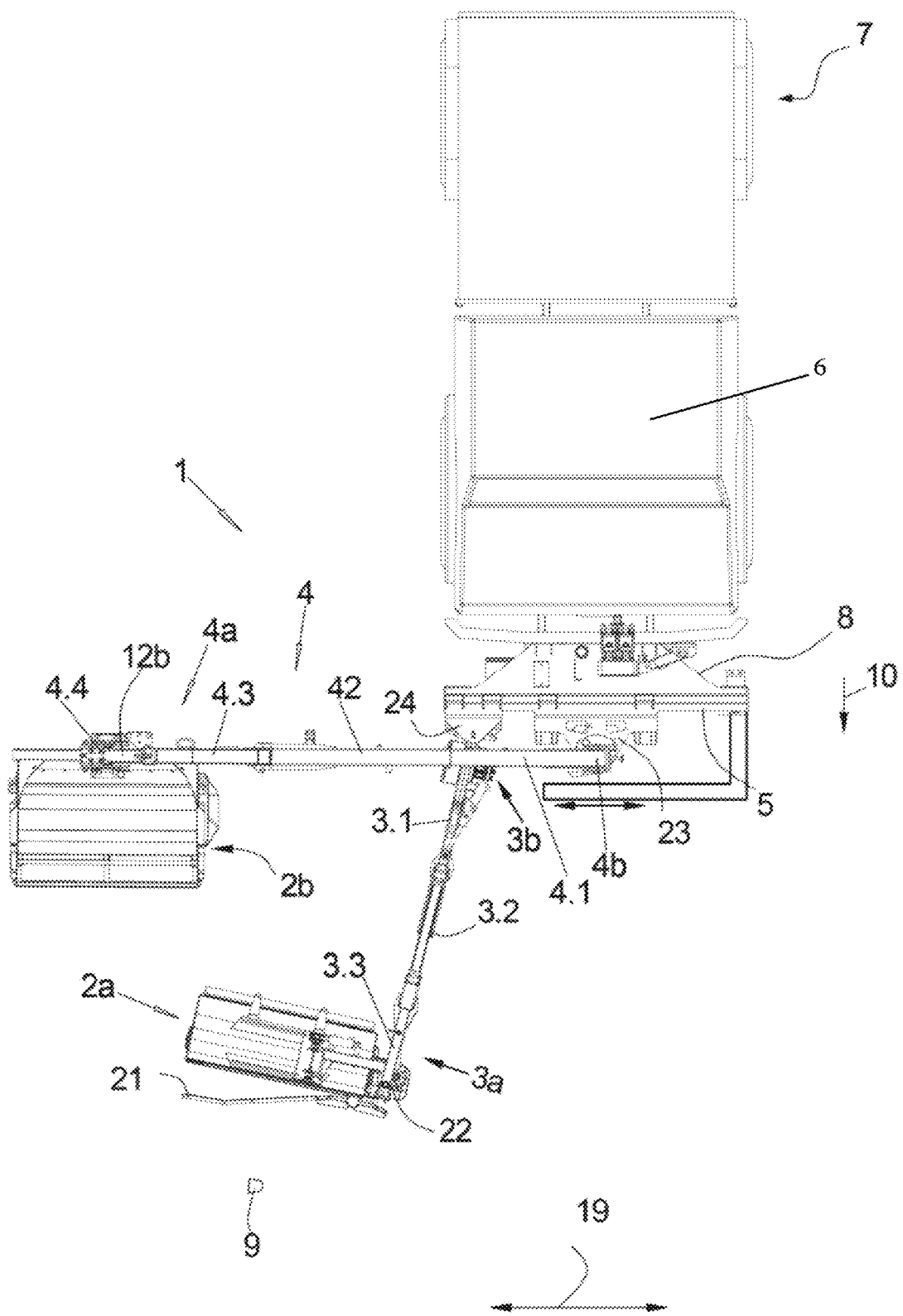
Figure 4A:
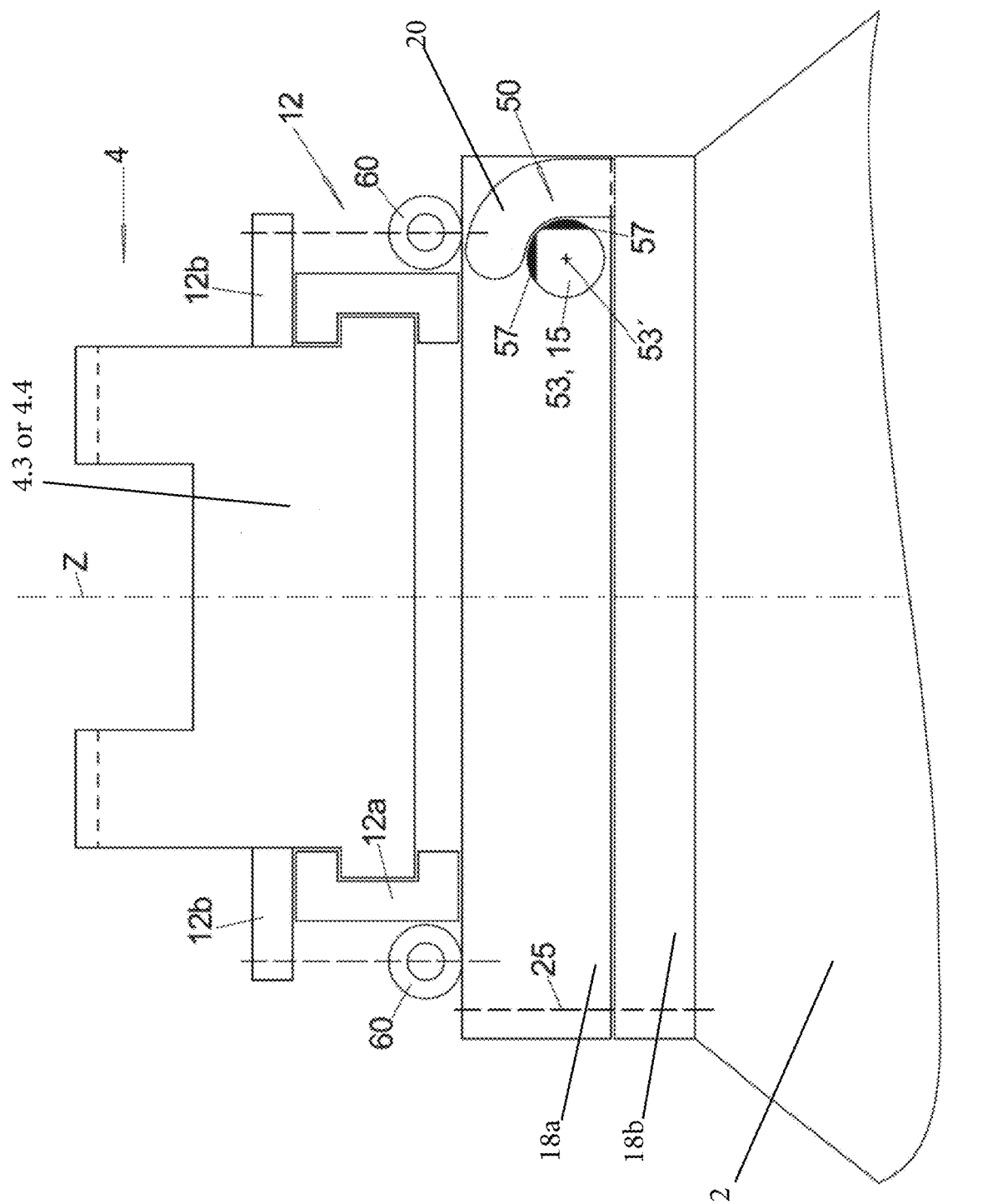
Figure 6A:
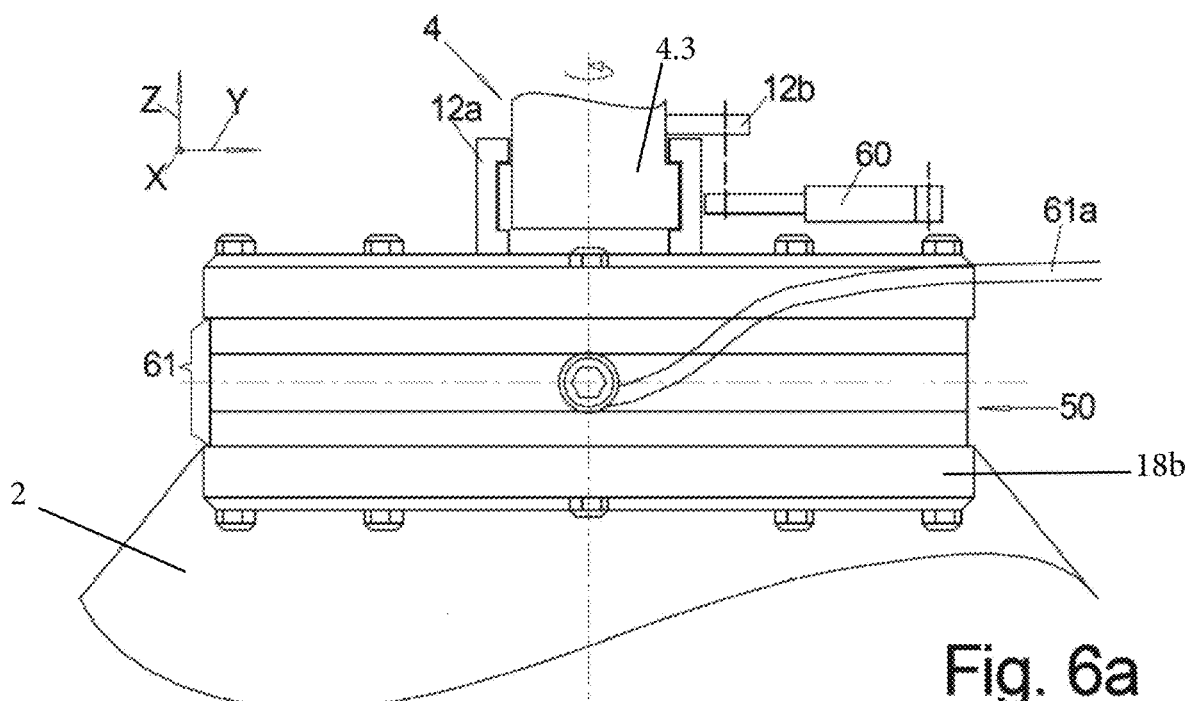
Figure 6B:
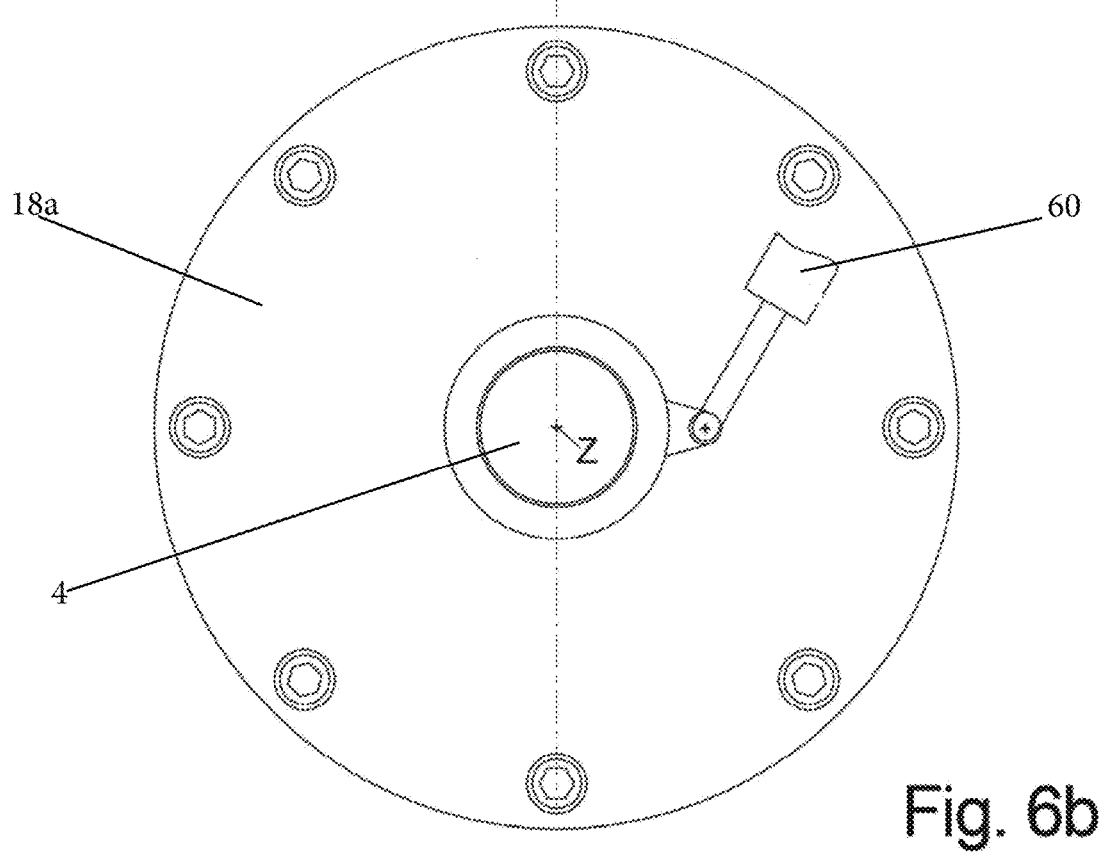
Figure 7A:
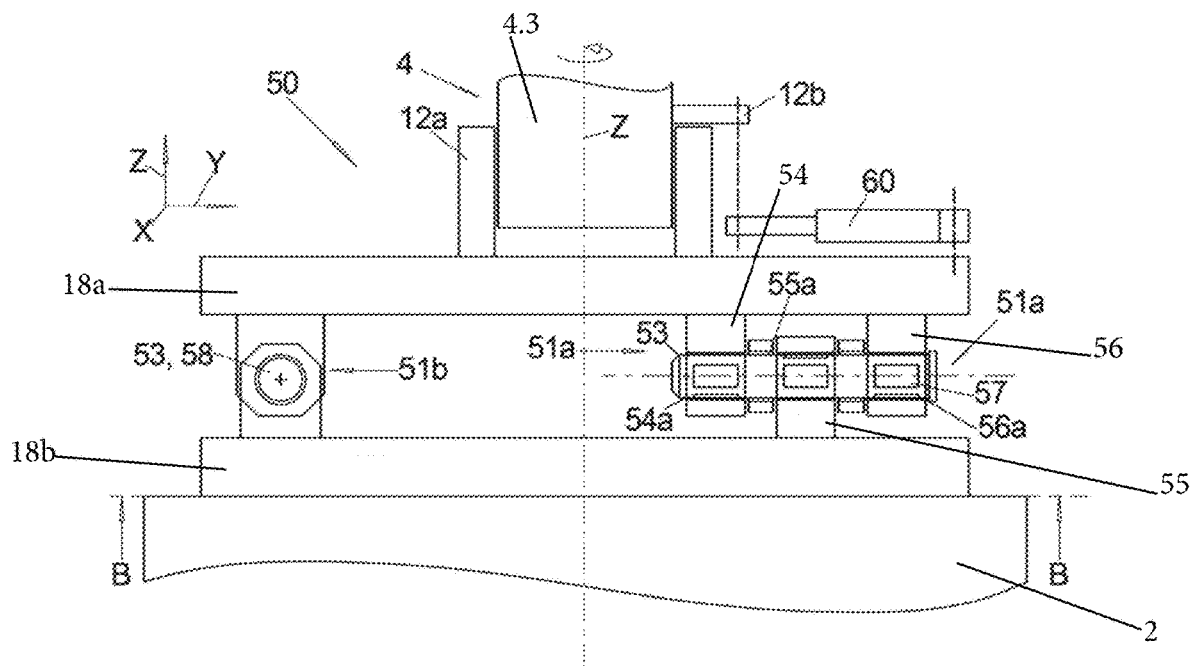

Types of embodiments according to the invention are described in more detail below as examples. It shows:

FIG. 1a, b: a known way of attaching a working head to the free end of a boom on a boom working unit in two different side views, FIG. 2a, b: a carrier vehicle with two boom mowers in front view and in top view, FIG. 3: one of the two mowing heads in enlarged single view in front view, FIG. 4a, b: a first embodiments of a load measuring unit at the boom of a boom working device in two different side views analogous to FIGS. 1a, b, FIG. 5: further designs of a load measuring unit at or in the boom of a boom working device in a side view analogous to FIG. 1a, FIG. 6a, b: a first embodiment of a load measuring unit between boom and working head for a boom working unit in side view as well as in top view on FIG. 6a, FIG. 7a, b: a second embodiment of a load measuring unit between boom and working head at a boom working unit in side view and in the view of FIG. 7a from below.

d) Detailed Description of the Invention

FIGS. 1a, b show a common way of attaching an exchangeable working head 2 to the free end of an boom 4 of an extension working device:

For attachment—seen in direction of—vof the working head 2 to be attached, shown in dashed line, is pushed towards the arm end 18a from the right as viewed in the direction of FIG. 1a in such a way that the locking pins 15 protruding on both sides—see FIG. 1b—of the arm end 18a in one side area of the arm end enter a locking recess 26, which are formed by hook-shaped curved locking elements 20, which are formed at the head end 18b of the working head 2 facing the arm end 18a of the boom 4 and positioned accordingly.

Arm end 18a and head end 18b must not yet be in the position with their surfaces facing each other, as the working head 2 can still be pivoted around the locking pins 15 in this state.

The working head 2 is only positioned and fixed positively and in a fixed position to the boom 4 by screw connection 25 between arm end 18a and head end 18b, preferably on the other side of the arm end 18a facing away from the locking pin 15.

FIGS. 1a, b also show a Z-joint 12 in the end area of the boom 4, with which the foremost arm part 4.3 of the jib arm 4 facing the working head 2 is mounted as joint part 12b opposite a joint part 12a non-rotatably attached to the arm end 18a about a Z-axis corresponding to the direction of extension of this arm part 4.3 and/or mostly perpendicular to the parting plane or contact surface between arm end 18a and head end 18b.

In this case, the pivoting is effected by means of two positioning elements 60 in the form of hydraulic cylinders, one end of which acts on the arm part 4.3, joint part 12.b, at different points of the circumference.

FIGS. 2a, b as well as FIG. 3 show a typical application of such a mounting on the basis of a mowing vehicle in the form of a carrier vehicle 7 with two mowing heads 2a, b as working heads during operation, each supported by a boom 3, 4 at its free front end:

Each mowing head 2a or 2b is driven by a mowing head motor 22 mounted on it.

Both booms 3, 4 are attached with their rear end to a stem 8 attached to the front of the carrier vehicle 7, in that the stem 8 carries a transverse offset rail 5 on its front side, along each of which a sliding shoe 23, 24 can be moved in transverse direction 19 and can be moved in a controlled manner during operation. One of the booms 4, 3 is attached to each sliding shoe 23, 24.

The booms 3, 4 each consist of several arm parts:

For example, the boom 4 consists of an arm part 4.1, which rises from the sliding shoe 23 approximately in the direction of vertical 11 and can be rotated around a vertical axis and from the free end of which another arm part 4.2 projects and can be rotated around a transverse axis and, analogously, another arm part 4.3.

The angular position of the arm parts to each other is controlled by hydraulic cylinders arranged in between, whereby the respective mowing heads 2a, b, which are additionally articulated around a Z-joint 12 at the front end of the boom 4, can be adjusted to any desired position with regard to direction of travel 10 (X-direction), horizontal cross direction 19 (Y-direction) here towards, as well as rotational position around the Z-axis. By means of a usually existing further X-joint in the boom 3, 4 near its free end, each mowing head 2a, b is additionally pivotable around the direction of travel 10, the X-axis, and can thus be pivoted around all three spatial directions and positioned in all 3 spatial directions as far as the dimensions of the boom 3, 4 allow.

As best shown in FIG. 2a, the operator sitting in the driver's cab 6 of the carrier vehicle 7 controls the mowing heads 2a, b in such a way that the mowing head 2a mows an edge strip area immediately next to the carrier vehicle 7 and is positioned in front of the front end 8 of the carrier vehicle 7, while the mowing head 2b mows the edge area adjacent to it on the side, which is further outwards in relation to the carrier vehicle 7, and is positioned behind the first mowing head 2a in direction of travel 10.

Due to this division, obstacles 9, which are in the area between the mowing widths of the two mowing heads 2a, b, such as road marker posts, can also be mowed around on both sides.

For this purpose, there is usually a feeler bar 21 on the front edge of the front mower head 2a, which is swivelled towards the mower head 2a when striking such an obstacle 9 and thus causes this mower head 2a to fold in around the Z-joint located on the vehicle-side face of this mower head 2a in relation to the boom 3 carrying it.

FIGS. 2a, b also show a display element 13 in the driver's cab 6 in the operator's field of vision, on which the measured loads can be output.

FIG. 3 shows the mower head 2b working further outwards in an enlarged individual view, including the Z-joint 12b, whereby the necessary positioning elements 60 are not shown:

This mowing head 2b has a housing 16, which is attached in the transverse center via this Z-joint 12 to the free end of the boom 4 so that it can swivel around the Z-axis, which is usually a vertical axis.

Inside the housing 16, which is open at the bottom, a blade shaft 17 is mounted with each of its two ends around a blade shaft axis 17' in a front flange of the housing 16.

FIGS. 4a, b show a 1st design and arrangement of a load measuring unit 50 for measuring the loads on the boom 4 when the working head 2 is attached to the boom 4 according to FIGS. 1a, b, with the measuring unit 50 arranged on the boom 4:

The two locking pins 15—or even just one—are embodied as load measuring bolts 53 and measure the loads acting on these pins.

On or in each of the load-measuring bolts 53, preferably strain gauges 57 are arranged for this purpose, preferably distributed over the circumference, preferably several, in particular in each case in the axial length region, in that the locking elements 20 rest against the locking pin 15, which is designed as a load-measuring bolt 53, so that each of the load-measuring bolts 53 can measure loads occurring on it in the two transverse directions to its longitudinal direction 53.

By appropriate electronic interconnection of the signals of the strain gages 57, not only forces in these two transverse directions can be measured, but also moments around these two transverse directions and/or around its longitudinal direction 53' if required.

In a side view, FIG. 5 shows further positions where a load measuring unit 50 can be arranged on or in the outrigger arm 4, in which case an X-joint 27 is shown upstream, i.e. on the side of the Z-joint 12 facing away from the working head 2, by means of which two interconnected arm parts 4.3 and 4.4 can be swivelled relative to each other about the X-direction in the end area of the outrigger arm 4, and thus also the working head 2:

The load measuring unit 50 may consist of one or preferably several strain gauges 57—then electronically connected to each other via an evaluation circuit—or may comprise one or several load measuring bolts 53—no matter according to which functional principle they function—or may be embodied in any other way, in particular as shown in Figures Ga, b or FIGS. 7a, b, but with a different positioning, and in particular may have any type of load sensors 51.

Possible positions for arranging such a load measuring unit 50—individually or in total—are shown:

at or in the arm end 18a, thus before, so to speak downstream, of the Z-joint 12, at or in the remaining boom 4 behind, so to speak upstream of the Z-joint 12, especially downstream and/or upstream of the X-joint 27, for example also between Z-joint 12 and X-joint 27.

FIGS. 6a, b and 7a, b, on the other hand, show an arrangement of the load measuring unit 50 between boom 4 and working head 2, i.e. especially between arm end 18a and head end 18b:

According to Figures Ga, b, the load measuring unit 50 in the form of a solution that is simple in terms of handling consists of using a so-called ring-shaped force transducer 61 instead of individual load sensors and fixing it between the arm end 18a and the head end 18b, in particular by screwing it down.

This is a—mostly cylindrical and/or plate-shaped—component 61 available on the market, which can measure forces, depending on the design, mostly in its axial direction and/or also in at least one of its two transverse directions to this, but above all can also measure torques around its longitudinal axis 61'.

In this case, such a ring-shaped force transducer 61 must only be screwed between the e.g. plate-shaped arm end 18a and the e.g. also mostly plate-shaped head end 18b, and the signal line 61a leading away from the ring-shaped force transducer 61 must be connected to the control 1* of the boom working device 1.

FIGS. 7a, b show another design of the load measuring unit 50 arranged between the boom 4 and working head 2, here between arm end 18a and head end 18b:

The load measuring unit comprises 50 load measuring bolts 53, which are pushed through alternate through-holes of bearing supports, whereby in this case three bearing supports 54, 55, 56 are arranged in series.

As FIG. 7a shows, the two bearing supports 54, 56 are attached to the arm end 18a of the boom 4 and project from there towards the head end 18b of the working head 2, while the bearing support 55 is attached inversely to the head end 18b, on the side facing the arm end 18a.

The bearing support 55 projects between the other two bearing supports 54, 56 in such a way that the through-openings 54a, 55a, 56a in each of the bearing pedestals are aligned with each other, so that the load bolt 53, which fits exactly in there, extends through all three and thus connects the arm end 18a to the arm end 18b at one point.

In the axial direction, axial spacer rings 59 are arranged between the bearing supports 54, 55, 56, which position the bearing blocks and thus the arm end 18a and head end 18b against each other in the axial direction of the load measuring bolts 53.

With only one such connection, this would be a still pivoting connection.

Figure 7B:
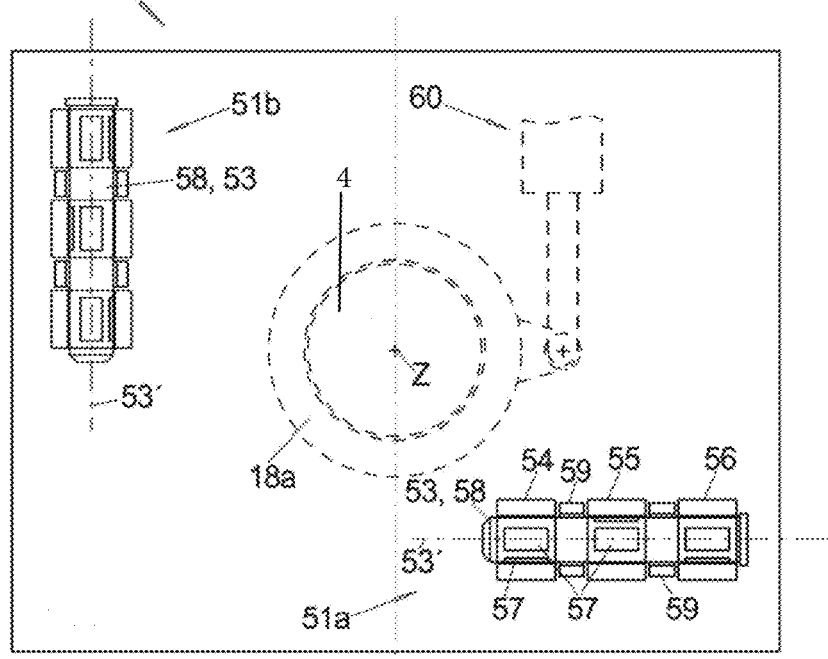

For this reason—as especially shown in the view of FIG. 7b—two such load measuring bolts 53 are arranged as described between the arm end 18a and the head end 18b, whereby their longitudinal extensions 53' are not aligned with each other but cross each other, especially at right angles.

The load measuring bolts 53 thus also serve here as positive-locking connecting elements 58 between head end 18b and arm end 18a.

LIST OF REFERENCE SIGNS 1 boom working device
1* control 2, 2a, b working head, mowing head
3, 4 boom
3a front end
3b back end
3.1/.2/.3 arm piece
4a front end
4b back end
4.1/.2/.3/.4 arm piece
5 cross offset rail
6 driver's cab
7 carrier vehicle
8 stem
9 obstacle
10 direction of travel
11 vertical
12 z-joint
12a, 12b hinge part
13 feeler roller
14 feeler roller
15 locking pin
16 housing
17 blade shaft
17' blade shaft axis
18a arm end
18b head end
19 cross direction
20 locking element
21 feeler bar
22 mowing head motor
23 sliding shoe
24 sliding shoe
25 screw connection
26 locking recess
27 x-joint
50 load measuring unit
51 load sensor
52 detection sensor
53 load measuring bolt
53' longitudinal direction
54 bearing support
54a through opening
55 bearing support
55a through opening
56 bearing support
56a through opening
57 strain gauges
58 connecting element
59 spacer ring
60 positioning element
61 ring-shaped force transducer
61a signal line

The invention claimed is:

1. A boom working device (1) for attachment to a carrier vehicle (7), comprising:
at least one boom (3, 4), a rear end (3b, 4b) of said at least one boom capable of being attached to the carrier vehicle (7),
an arm end (18a) as a front end (3a, 4a) of the at least one boom (3, 4),
a working head (2) attached to an arm end (18a) with a head end (18b) of said working head facing the arm end (18a),
a load measuring unit (50) with at least one load sensor (51) capable of detecting loads acting on the at least one boom (3, 4),
where the load measuring unit (50) is arranged at one of the following of:
a location on the boom (3, 4),
a location in the boom (3, 4), or,
a location between the head end (18b) and the arm end (18a).

2. The boom working device according to claim 1, where the arm end (18a) is pivotable relative to a rest of the at least one boom (3, 4), by a Z-joint (12) about a Z-axis (Z) and/or by an X-joint (27) about an X-axis (Z),
and/or
the boom working device (1) comprises only one load measuring unit (50).

3. The boom working device according to claim 1, where the load measuring unit (50) can detect forces acting on the at least one boom (3, 4) in more than one direction,
the load measuring unit (50) can measure forces and/or moments acting on the at least one boom (3, 4) in the X, Y and Z directions,
and/or
the load measuring unit (50) comprises a plurality of load sensors (51a, b) for detecting loads acting on the boom (3, 4).

4. The boom working device according to claim 1, where the load measuring unit (50) is arranged either:
at the arm end (18a);
in the arm end; or
at a rest of the at least one boom (3, 4) either:
behind a Z-joint (12) between the Z-joint (12) and an X-joint (27);
behind the X-joint (27); or
in the X-joint.

5. The boom working device according to claim 1, where the at least one boom (3, 4) is positively connected to the working head (2) via a removable connecting element (58), and
the load measuring unit (50) is either:
present on the connecting element (58), or
is the connecting element (58).

6. The boom working device according to claim 1, where the head end (18b) is attached to the arm end (18a) so that the head end (18b) cannot rotate.

7. The boom working device according to claim 1, further comprising:
at least one recognition sensor (52) for detecting the working head (2) where the at least one recognition sensor (52) is located:
at the boom (3, 4),
in the boom (3, 4), or
between the head end (18b) and the arm end (18a).

8. The boom working device according to claim 1, where the boom working device further comprises at least one detection sensor (52) and the at least one detection sensor (52) and the one load sensor (51) are functionally adjusted,
and/or
the load measuring unit (50) comprises at least one detection sensor (52).

9. The boom working device according to claim 1, where the at least one load sensor (51) of the load measuring unit (50) is an electrical sensor capable of measuring a change in an electrical voltage and/or an electrical resistance,
the load measuring unit (50) further comprises a strain gauge (57), and
the strain gauge (57) is arranged in a recess in the arm end (18a) or in a remainder of the boom (3, 4).

10. The boom working device according to claim 1, further comprising:

a plurality of strain gauges (57), where each individual strain gauge (57) is oriented differently from every other strain gauge (57), the plurality of strain gauges (57) are connected to each other by an electrical bridge circuit, and at least one pair of strain gauges (57) measures a bending load of the arm end (18*a*) and/or at least one other pair of strain gauges (57) measures a torsional load of the arm end (18*a*).

11. The boom working device according to claim 1, where the load measuring unit (50) further comprises:

at least one load measuring bolt (53) which measures and outputs a force applied to the load measuring bolt (53) in at least one of the transverse directions to a direction of extension (53') of the at least one load measuring bolt (53) and/or in the direction of extension (53') thereof.

12. The boom working device according to claim 1, where the head end (18*b*) is attached to the arm end (18*a*) by a locking bolt (15) fixed to the arm end (18*a*), where the locking bolt (15) is a load measuring bolt (53).

13. The boom working device according to claim 1, where the head end (18*b*) is attached to the arm end (18*a*) by a removable connecting element (58) provided between the arm end (18*a*) and the head end (18*b*), where:

the arm end (18*a*) has a bearing support (54, 56) with a first through opening (54*a*, 56*a*) on a surface of the bearing support (54, 56) directed towards the head end (18*b*), the head end (18*b*) has a bearing block (55) with a second through opening (55*a*) on a surface of the bearing block (55) directed towards the arm end (18*a*), a removable load measuring bolt (53) extends through the first through opening (54*a*, 56*a*) and the second through opening (55*a*).

14. The boom working device according to claim 1, further comprising:

at least two load measuring bolts (53) extending in different transverse directions (X, Y) to a Z-direction.

15. The boom working device according to claim 1, further comprising a load measuring bolt (53), where:

forces acting on the load measuring bolt (53) are measured in two radial planes of the load measuring bolt (53) axially spaced apart in a direction of extension (53'), if the load measuring bolt (53) is used as a connecting element (58), then a first bearing supports (54) and a second bearing support (56) with aligned first and second through-openings (54*a*, 56*a*) are arranged between which a third bearing support (55) with a third through opening (55*a*) fits such that the first, second, and third through-openings (54*a*, 56*a*, 55*a*) are aligned to form a total through opening, the load measuring bolt (53) extends through the total through opening.

16. The boom working device according to claim 1, further comprising:

at least one load sensor (51) arranged at the arm end (18*a*) of the boom (3, 4) without contact to the head end (18*b*) of the working head.

17. The boom working device according to claim 1, where the load measuring unit (50) further comprises:

a cylindrical, ring-shaped force transducer (61), where the force transducer (61) is capable of measuring at least forces in an axial direction (61') of the force transducer (61) and/or torques about one of the transverse directions of said axial direction (61'), and the force transducer is arranged with said axial direction (61') running in a longitudinal direction (10), between the arm end (18*a*) and the head end (18*b*).

18. A method for detecting loads acting on a boom (3, 4) of a boom working device (1) according to claim 1, the method comprising the steps of:

measuring a load, where the load is acting:
 on the boom (3, 4),
 in the boom (3, 4), or
 between a head end (18*b*) of a working head (2) and an arm end (18*a*) of the boom (3, 4).

19. A self-propelled working machine comprising:

a carrier vehicle (7), a boom working device (1), the boom working device (1) comprising:

at least one boom (3, 4), comprising a plurality of positioning elements (60) capable of positioning any of a plurality of arm parts (3.1, 3.2, 3.3 or, 4.1, 4.2, 4.3, 4.4) relative to one another, a working head (2) attached to a free front end (3*a*, 4*a*) of the multi-part boom (3, 4), the at least one boom capable of coming into contact with the environment away from the carrier vehicle (7) during use, a load measuring unit (50) for measuring loads acting on the at least one boom (3, 4), and a control (1*) capable of controlling a plurality of actuators, where the control (1*) of the boom working device (1) controls the plurality of actuators according to signals received by the load measuring unit (50).

* * * * *